Aug. 18, 1959   J. HIRSCH   2,899,899
STIFFENER AND STABILIZER FOR SUPERSONIC VEHICLES
Filed March 14, 1955
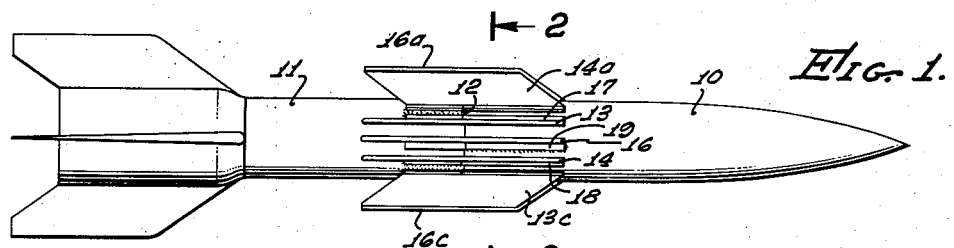
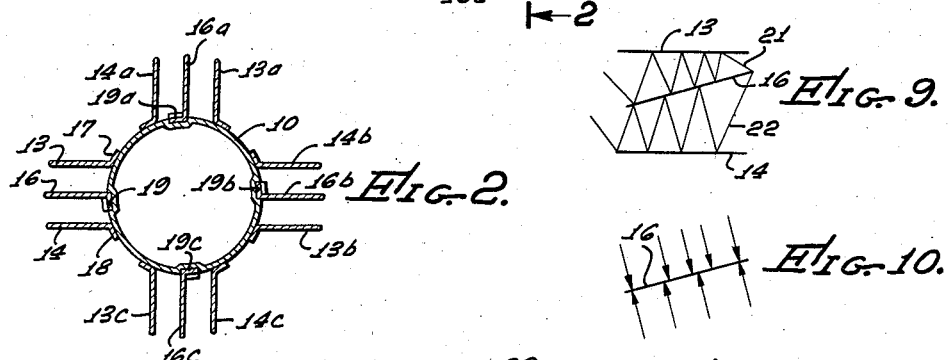
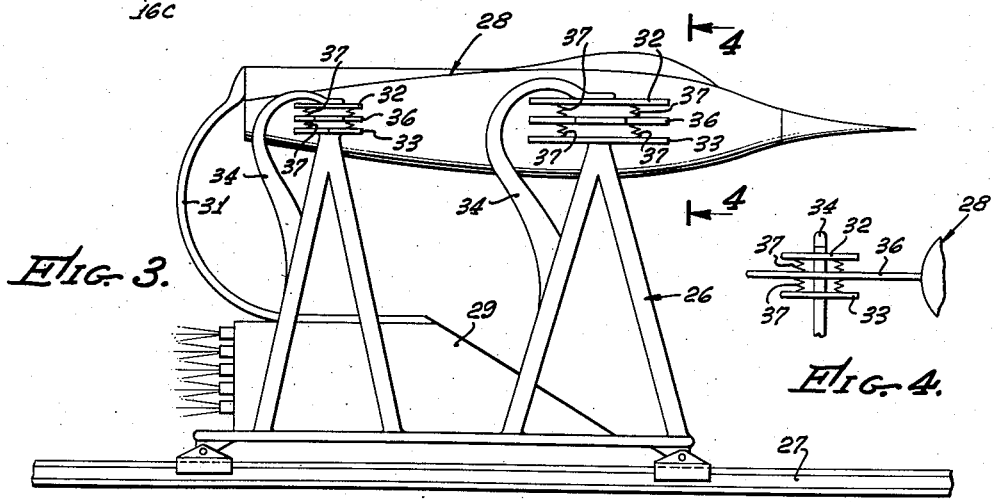
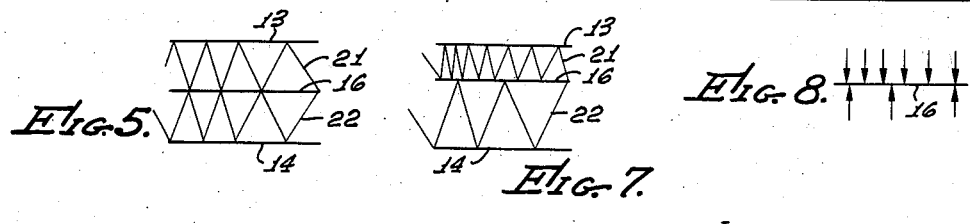
JOSEPH HIRSCH,
INVENTOR.
BY
ATTORNEY.

United States Patent Office 2,899,899
Patented Aug. 18, 1959

2,899,899

STIFFENER AND STABILIZER FOR SUPERSONIC VEHICLES

Joseph Hirsch, Pacific Palisades, Calif.

Application March 14, 1955, Serial No. 494,031

6 Claims. (Cl. 102—49)

(Granted under Title 35, U.S. Code (1952), sec. 266)

The invention described herein may be manufactured and used by or for the Government of the United States of America for governmental purposes without the payment of any royalties thereon or therefor.

This invention relates to stiffening, stabilizing and control apparatus, and more particularly to a means for maintaining two independently movable components of a supersonic vehicle in a predetermined desired relationship relative to each other. The invention also relates to vehicles embodying such means.

Vehicles traveling through air at supersonic speeds are subjected to extremely large aerodynamic forces which tend to cause misalignment, vibration and breakage of the various vehicle components, particularly where the vehicle is constructed with two components adapted to move independently of each other or to separate at one point during a flight. The problems presented by such aerodynamic forces are compounded where the vehicle is traveling at supersonic speed on the ground, since any unevenness or defect along the track on which the vehicle is traveling will supplement the aerodynamic forces and result in a destructive action tending to create instability and damage.

In view of the above problems presented when supersonic vehicles are traveling either through the air or on the ground, it is an object of the present invention to provide a stiffening and stabilizing means for preventing or correcting the misalignment, vibration, instability, etc., which are likely to occur at supersonic speeds.

A further object of the invention is to provide supersonic vehicles which make use of the shock waves created by supersonic travel to provide stiffening, stabilizing and control effects.

These and other objects and advantages of the invention will be more fully set forth in the following specification and claims considered in connection with the attached drawing to which they relate.

In the drawing:

Figure 1 is a side elevational view of a two-stage rocket incorporating the stiffening and stabilizing means of the invention, the showing being largely schematic;

Figure 2 is a transverse sectional view taken along line 2—2 of Figure 1;

Figure 3 is a side elevational view of a test carriage adapted to move at supersonic speeds along a track, and also incorporating the stiffening and stabilizing means of the invention;

Figure 4 is a fragmentary elevational view as viewed from station 4—4 of Figure 3, and looking in the direction of the arrows;

Figure 5 is a schematic view illustrating the shock waves present between plates when the latter are equally spaced and perfectly parallel;

Figure 6 is a schematic illustration of the opposing shock forces present when the condition of Figure 5 exists;

Figure 7 is a schematic representation of the shock waves present between parallel plates when they are not equally spaced relative to each other;

Figure 8 is a schematic representation of the shock forces present when the condition of Figure 7 exists;

Figure 9 is a schematic representation of shock waves present when the plates are not parallel to each other; and Figure 10 is a schematic representation of the shock forces present under the Figure 9 condition.

Referring first to Figures 1 and 2 of the drawing, there is illustrated a two-stage rocket assembly comprising a main rocket or forward compartment 10, and a booster rocket 11. With such an arrangement, the booster rocket 11 pushes the main rocket 10 until burn out, after which the booster rocket falls away from the main rocket so that the latter continues in its flight with a much greater supply of fuel than would be the case if no booster were employed.

In a booster assembly of the type illustrated, substantial problems exist with regard to thrust alignment, stiffness, instability, flutter, etc., particularly since any booster connection at 12 must allow for separation of the components and is therefore limited in regard to stiffness. Misalignment of the thrust through the center line or axis of the main rocket 10 can set off the above-mentioned problems at supersonic speeds where large aerodynamic forces exist. These forces can induce bending which causes thrust misalignment, and this misalignment causes further bending so that the final result is instability and failure.

In previous two-stage rocket assemblies the main and booster rockets were connected solely by mechanical means adapted to break apart after burn out of the booster. In constructing such assemblies, attempts were made to eliminate the above-mentioned misalignment and other problems by very careful design of surfaces and by use of special mechanical stiffening and linkage means. However, no matter how carefully the alignment was made, some amount of misalignment always existed at supersonic speeds. This small amount was sufficient to cause the above difficulties, and such difficulties could not be overcome with mere mechanical connectors and linkages without unduly complicating the problem of separation of the rockets 10 and 11 after burn out.

According to the present invention, a pair of fins, plates or vanes 13 and 14 are mounted generally radially on one of the rocket components, preferably the booster rocket 11. In addition, a single fin, plate or vane 16 is mounted radially on the other rocket component 10 coextensive with and between fins 13 and 14. In order to increase their own stiffness, fins 13 and 14 are preferably formed integral with flanges 17 and 18 which are recessed into and welded to the booster 11. Correspondingly, the fin 16 is formed integral with a flange 19 which is recessed into and welded to the main rocket or forward compartment 10. In order to increase the stiffness of their associated fins, the flanges 17, 18 and 19 extend movably over unrecessed portions of the rocket components to which they are not welded. Preferably, four groups of three fins each are arranged at ninety degree angles around the periphery of the rockets 10 and 11, and as illustrated in Figure 2. These may be designated 13a, 14a, 16a; 13b, 14b and 16b; and 13c, 14c and 16c. Since the operation of each group of fins is the same, the fin structure and theory of operation will only be described with relation to the fins 13, 14 and 16.

It is of importance that the outer surfaces of the central fin 16 lie in planes which are parallel to each other and to the planes containing the inner or opposed surfaces of fins 13 and 14. These planes are all parallel to the common axis of rockets 10 and 11. Preferably, the rocket components 10 and 11 are initially rotated relative to each other so that fin 16 is exactly midway between fins 13 and 14. There need be no mechanical connection between the main rocket 10 and booster 11, but only abutment therebetween at 12. However, some mechanical connection may be employed if desired, in which case provision is made for breakage of the mechanical connection after burn out of booster rocket 11.

In the operation of the two-stage rocket assembly, the booster rocket 11 is first ignited and pushes the main rocket 10 upwardly. As soon as supersonic speeds are reached, shock waves are created between the opposed parallel surfaces of fins 13 and 16, and between the opposed parallel surfaces of fins 14 and 16. These shock waves are represented, respectively, at 21 and 22 in Figure 5 and pass back and forth between the opposed fin surfaces in directions which are increasingly normal thereto. As shown in Figure 6, when the fins 13, 14 and 16 are perfectly parallel and when fin 16 is exactly midway between fins 13 and 14, opposed forces against fin 16, and represented by the arrows, are equal and opposite. This creates a stabilizing force tending to maintain fin 16 parallel to and midway between fins 13 and 14. Since fin 16 is connected to main rocket 10, and since fins 13 and 14 are connected to booster rocket 11, it follows that a stable connection will be created between these rocket components which will prevent the misalignment, flutter, etc., indicated above. As soon as the booster rocket 11 burns out, it merely drops away from main rocket 10 and the latter continues in flight with its attached fins 16, 16a, 16b, and 16c serving as stabilizing means. The indicated arrangement of fins will also result in better separation of the booster rocket from the main rocket.

If at any time during supersonic flight the fin 16 becomes closer to one of its adjacent fins, for example to fin 13 as shown in Figure 7, the shock wave 21 between fins 13 and 16 will, as shown in Figure 8, create a much greater force than will the shock wave 22 between fins 14 and 16. It follows that a force will be created against fin 16 which will push it toward fin 14 until the mid-point is achieved, and this will cause the rocket components 10 and 11 to resume their desired aligned and stable relation. Furthermore, if the main rocket 10 tends to bend away from booster rocket 11, so that fin 16 assumes an angle relative to fins 13 and 14 as shown in Figure 9, the shock waves 21 and 22 will, as shown in Figure 10, create a return bending moment which will cause fin 16 and its attached main rocket 10 to bend back into alignment relative to booster rocket 11. Under all conditions, therefore, the main and booster rockets are maintained in stable and aligned condition as desired.

It is of importance to note that the pressures generated between the fins 13, 14 and 16 at supersonic speeds are of large magnitudes, so that only relatively small fins need be employed. For example, it is possible to create over 20,000 pounds of force with a fin having but one square foot of area. The spacing between fin 16 and either of its cooperating fins 13 and 14 should be on the order of from 1 to 4 inches. The fins should not be made excessively large since the shock waves 21 and 22 tend to become more and more normal to the planes of the fins. Thus, if excessively large fins were used the shock waves would not be able to pass through the space between the fins and relative air flow would be prevented. The action of the shock waves between the parallel surfaces may be termed supersonic choking.

The described differences in pressure between fins 13, 14 and 16 may be used as the actuating forces in a stability control system. For example, these differences in pressure may be relayed to a pressure sensitive transducer with the result that the variations in pressure on the transducer change electrical characteristics of the control system. The electrical signals or changes resulting from pressure variations are then modulated and amplified, and can be used to control suitable elevators, jet vanes, etc., adapted to maintain correct flight attitude.

The various fins may also be employed as part of another type of control system. The plate or fin 16 can be made movable so as to serve as an aileron to direct flight, use being made of suitable actuators. For example, movement of fin 16 by an actuator may serve to move the cooperating fins 13 and 14 to thereby change the direction of the entire rocket assembly.

Referring next to the structure shown in Figures 3 and 4, a test carriage 26 is illustrated as mounted on a horizontal track 27 for movement therealong at high supersonic speeds. The item 28 to be tested, for example, an airplane the aerodynamic characteristics of which it is desired to discover, is mounted at the upper portion of the test carriage by means to be described below. A rocket motor 29 is mounted on the test carriage for the purpose of propelling the same. A mechanical brace means 31, attached to carriage 26, is abutted against the tail of the test item 28 for the purpose of preventing the latter from falling behind the test carriage as it accelerates rapidly.

According to the invention, spaced parallel plates 32 and 33 are mounted in horizontal positions at the upper portion of test carriage 26, the upper plates 32 being secured by means of rigid connectors 34 provided on the carriage. Preferably, a pair of plates 32 and 33 are mounted at the forward portion of the carriage, and a second pair at the rear portion thereof. Disposed between each pair of plates 32 and 33 is a wing or fin 36 which is rigidly associated with the test item 28. The wings or fins 36 are disposed midway between the associated plates 32 and 33, and have surfaces which are parallel to each other and to the adjacent opposed surfaces of the plates. Soft compression springs 37 are mounted between the wings 36 and the adjacent plates 32 and 33 to maintain them in the desired spaced relationship when the carriage is traveling at subsonic speeds.

In the operation of the test apparatus shown in Figures 3 and 4, the rocket motor 29 is ignited and the carriage 26 accelerates rapidly, with mechanical element 31 serving to cause acceleration of the test item 28 with the carriage. While the carriage and test item are still traveling at subsonic speeds, the springs 37 maintain the wings 36 and test item 28 resiliently in the desired position. However, as soon as supersonic speeds are achieved the springs 37 become substantially ineffective, and substantially all stabilizing effect is due to the supersonic choking caused by the presence of the opposed parallel surfaces of wings 36 and plates 32 and 33. This action is the same as was described in connection with Figures 5–10.

A very important advantage of the apparatus illustrated in Figures 3 and 4 is that any forces and shocks transmitted from the track 27 through carriage 26 are damped, due to the aerodynamic action between wings 36 and plates 32 and 33, so that there is almost no unstabilizing force transmitted to the test item 28 itself. An extremely stable carriage is thus produced, and the forces transmitted to the test item are kept at a minimum. It is pointed out that while the carriage is traveling at subsonic speeds the problem of stability and the forces transmitted from the track, are relatively minor. Accordingly, the springs 37 are adequate to create the desired stability at subsonic speeds.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A device for operatively associating two vehicle or missile elements affixed together and traveling through the atmosphere at supersonic speeds, which comprises first and second plates or fins rigidly mounted on one of said elements in spaced generally parallel relation relative to each other, and a third plate or fin rigidly mounted on the other of said elements and normally disposed midway between said first and second plates or fins, all of said plates or fins being exposed to the ambient atmosphere through which said elements are traveling, said third plate or fin providing normally identical parallel channels between its opposite faces and the confronting faces of the first and second plates or fins for producing shock waves of equal magnitude of force in said channels when said plates are so disposed, and of unequal magnitude of force when said plates tend to relatively move to a position wherein said channels are not identical, whereby a restoring force tends to render said channels identical and apply forces through the respective plates to the elements to which they are mounted.

2. Apparatus for operatively associating two vehicle or missile elements or components affixed together and traveling through the atmosphere at supersonic speeds, which comprises means to define first and second plane surfaces fixed in position relative to one of said elements, said surfaces being parallel to each other and being spaced apart to form an air space therebetween through which ambient air passes due to travel of said elements, and a plate mounted in said air space and generally parallel to and midway between said first and second surfaces, said plate being rigidly affixed to the other of said elements.

3. A supersonic vehicle, which comprises first and second independently movable body elements, means to propel said body elements together at supersonic speeds and along a predetermined axis of said body elements, a pair of fins fixedly mounted exteriorly on said first body element and spaced apart relative to each other, the opposed surfaces of said fins lying in planes which are parallel to each other and to said axis, and an additional fin fixedly mounted on said second body element and disposed between the fins of said pair, said third fin being generally parallel to and midway between the fins of said pair so that supersonic choking of air may pass between said fins.

4. A supersonic vehicle, which comprises a body, means to propel said body, means on said body to define first and second spaced parallel plane surfaces between which ambient air is adapted to pass at supersonic speeds, plate means having parallel plane surfaces and disposed between and generally parallel to said first and second surfaces, and means to connect at least one of the first and second mentioned means to an element to be controlled due to the action of shock waves between said plate means and said first and second surfaces.

5. A two-stage rocket assembly, which comprises first and second rockets disposed in tandem abutting relationship, one of said rockets being adapted to act as a booster for the other and then to drop away therefrom, first stabilizing means comprising a first fin rigidly mounted on said first rocket in a first plane containing the axis thereof, and second and third fins rigidly mounted on said second rocket and disposed on opposite sides of and spaced from said first fin, said second and third fins lying in planes which are parallel to each other and to said first plane, and other like stabilizing means similarly disposed on said rockets and angularly spaced from the said first stabilizing means constructed and arranged to stabilize said rockets against deflection away from their common axis.

6. Apparatus comprising two components affixed together and adapted to travel through air at supersonic speed, and subject to relative orientation therebetween away from a reference axis in response to aerodynamic forces experienced by the components, and means for restoring relative orientation of said components toward said reference axis, said means comprising at least one set of normally parallel and adjacent channels disposed with the longitudinal axes thereof substantially parallel with said reference axis, said channels being formed by a common intermediate wall rigidly affixed to one of said components and by other walls rigidly affixed to the other component, the construction and arrangement of said walls being such that said channels are open for entry of ambient air, said channels being so proportioned that shock waves are produced therein, the shock waves producing forces on said walls which are balanced in magnitude when said components are oriented parallel to said reference axis, and producing forces of unequal magnitude when said components are oriented relatively away from said reference axis, whereby said forces of unequal magnitude act to resist the aerodynamic forces tending to orient said components relatively away from said reference axis.

References Cited in the file of this patent
UNITED STATES PATENTS

| 2,383,053 | Fanger | Aug. 21, 1945 |
| 2,654,320 | Schmid | Oct. 6, 1953 |